(12) United States Patent
Blackwall Moulsdale

(10) Patent No.: US 7,350,640 B2
(45) Date of Patent: Apr. 1, 2008

(54) VIBRATORY CONVEYOR

(75) Inventor: Timothy John Blackwall Moulsdale, Bucks (GB)

(73) Assignee: Wright Machinery Limited (GB)

( * ) Notice: Subject to any disclaimer, the term of this patent is extended or adjusted under 35 U.S.C. 154(b) by 146 days.

(21) Appl. No.: 10/595,389

(22) PCT Filed: Oct. 7, 2004

(86) PCT No.: PCT/GB2004/004318

§ 371 (c)(1),
(2), (4) Date: Apr. 13, 2006

(87) PCT Pub. No.: WO2005/040737

PCT Pub. Date: May 6, 2005

(65) Prior Publication Data

US 2007/0034417 A1    Feb. 15, 2007

(30) Foreign Application Priority Data

Oct. 15, 2003    (GB) ................................ 0324146.0

(51) Int. Cl.
 *B65G 27/08* (2006.01)
(52) U.S. Cl. .................... 198/759; 198/502.1; 177/119
(58) Field of Classification Search ............ 198/502.1, 198/502.2, 759, 764, 752.1, 761, 763; 177/16, 177/119, 122
See application file for complete search history.

(56) References Cited

U.S. PATENT DOCUMENTS 4,313,535 A    2/1982   Carmichael
5,094,342 A *  3/1992   Kraus et al. ................. 798/761
5,445,261 A *  8/1995   Kimura ....................... 198/763
6,019,216 A *  2/2000   Patterson .................. 198/752.1
6,161,680 A * 12/2000   Martin et al. ............... 198/763
2001/0019009 A1  9/2001   Gilman
2004/0163933 A1*  8/2004   Jones ....................... 198/752.1

FOREIGN PATENT DOCUMENTS

DE    1960107 A    11/1969
EP    0803715 A    10/1997

OTHER PUBLICATIONS

International Preliminary Report on Patentability issued for International Application No. PCT/GB2004/004318, date of issuance of report Apr. 18, 2006.
International Search Report for International Application No. PCT/GB2004/004318, date of mailing Jan. 21, 2005.

\* cited by examiner

*Primary Examiner*—James R. Bidwell
(74) *Attorney, Agent, or Firm*—Darby & Darby P.C.

(57) ABSTRACT

A vibratory conveyor is provided which comprises a machine frame, a twoarmed lever mounted on the frame for pivotal movement about an axis, a reaction base mounted on one arm of the lever, and a conveyor element for conveying a product from one end to the other. Leaf springs are connected between the conveyor element and the reaction base and arranged to vibrate so as to cause the conveyor element to convey product. A sensor is disposed between the said one arm and the machine frame for sensing the weight of product on the conveyor element. The lever and conveyor element are so arranged that a line connecting the axis of pivotal movement of the lever and the center of mass of the conveyor element runs perpendicular to the length of the leaf springs.

10 Claims, 2 Drawing Sheets

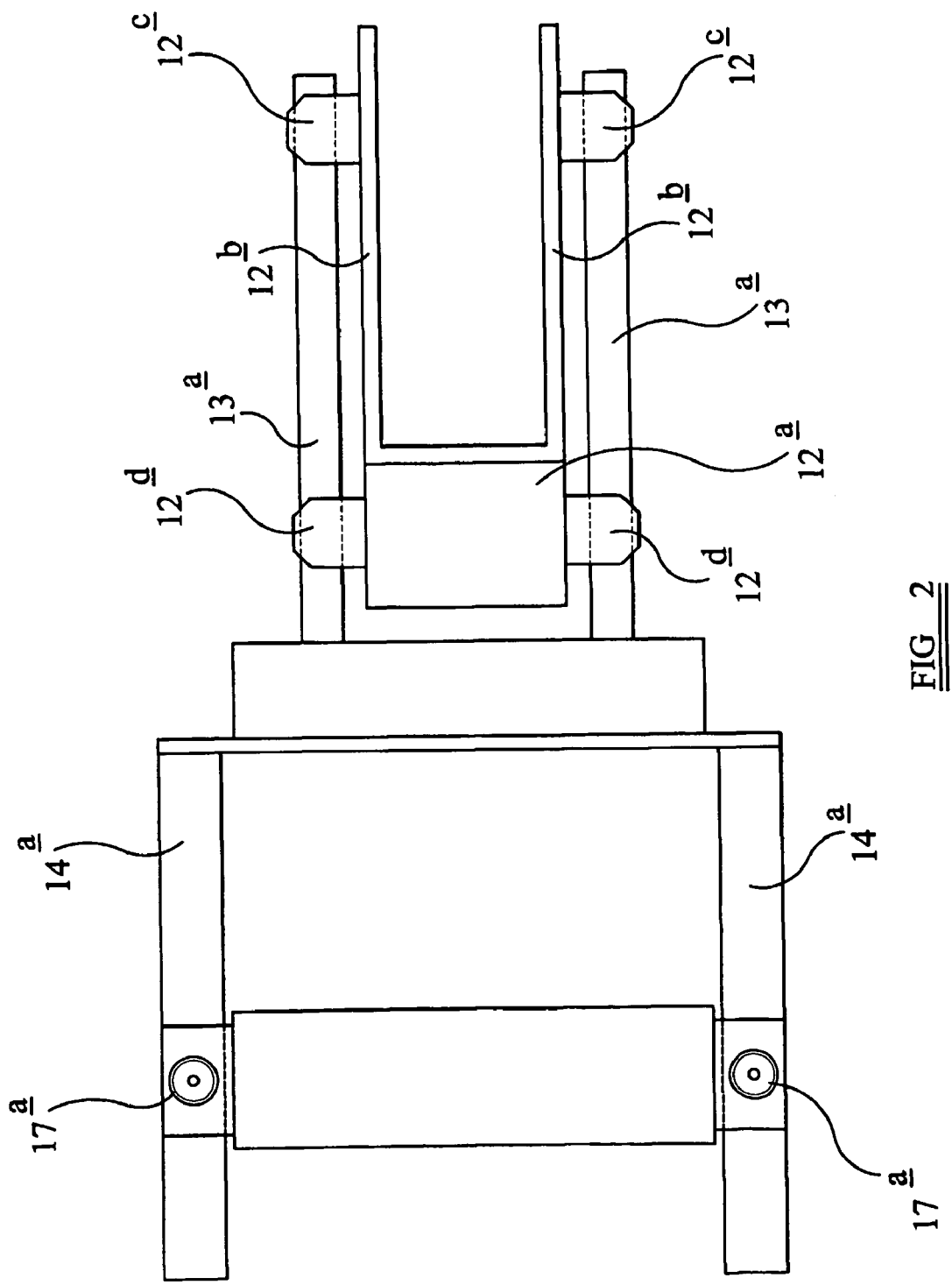

VIBRATORY CONVEYOR

Figure 1:
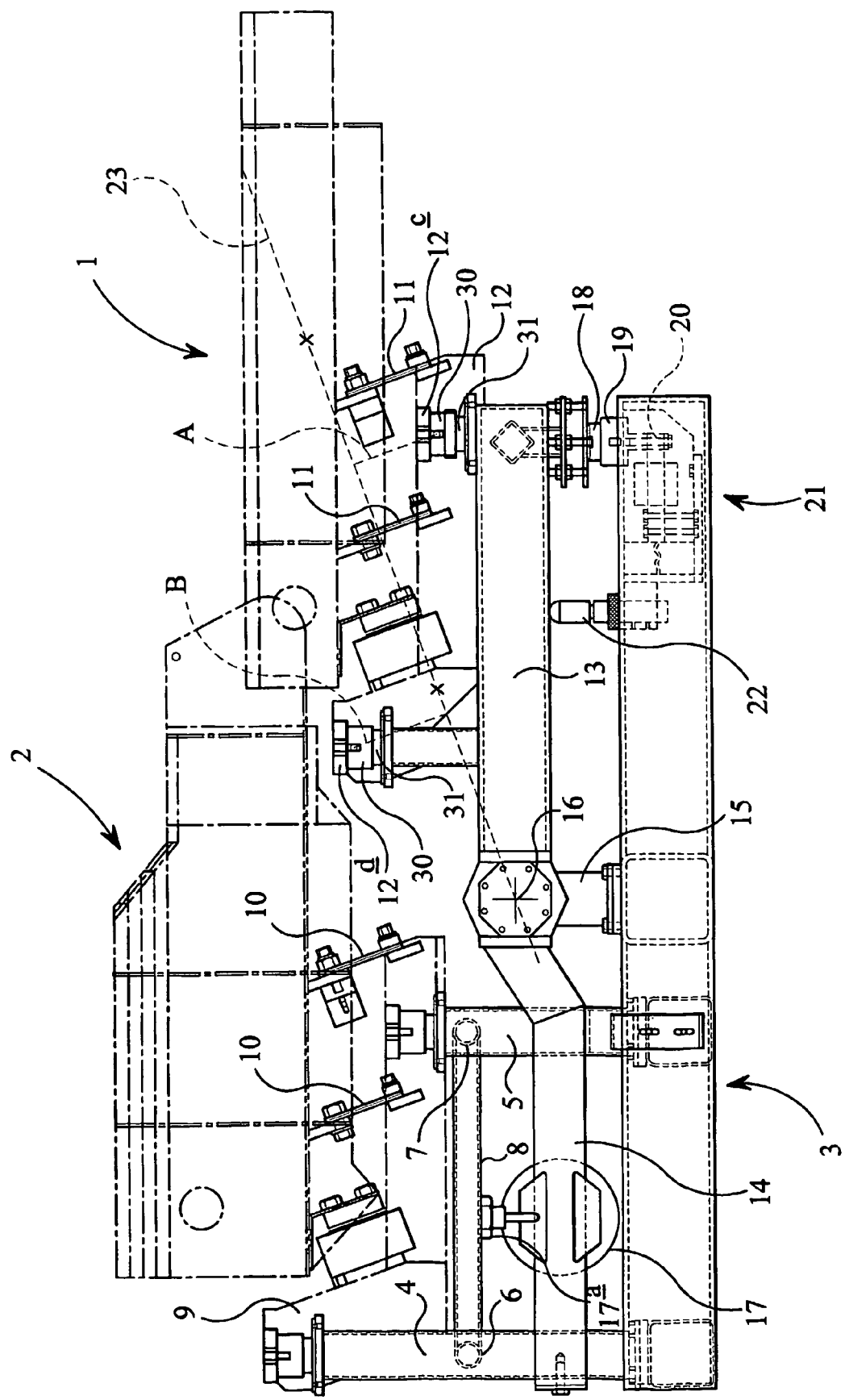

This invention relates to a vibratory conveyor and, more particularly, to a vibratory conveyor element which is provided with a weighing device.

The principle underlying the use of a conveyor element having a weighing device is that a vibratory conveyor conveys a given product at a known velocity, so that if one knows the weight of product on the conveyor element one also knows the mass flow rate. Products which are transported by vibratory conveyors include such items as crisps and other snack foods. Flavourings and the like are commonly added to snack foods as they are being transported, and to ensure that the flavouring is applied at the correct rate it is important to know the mass flow rate of the product. The invention as described herein is particularly intended for use in conjunction with a system for adding a flavouring to a snack food product. It is to be understood, however, that it is of general application where it is desired to determine the weight of product which is on a vibratory conveyor at any given time.

EP-A-803715 describes a vibratory conveyor element provided with a weighing device. In the apparatus described therein, the conveyor element is mounted on a base, and a load cell is disposed between the conveyor element and the base for sensing the weight of product on the conveyor element. The weight of the conveyor element itself is counterbalanced by another weight, so that only the weight of the product bears on the load cell. The above-mentioned base is connected to the upper ends of vibrating leaf springs, which thereby apply a vibrating drive force to the conveyor element via the base. However, it is inherent in this construction that the load cell is also subject to this vibration, and this has the potential for disturbing the load cell readings and rendering them less accurate than would otherwise be the case. It is an object of the present invention to provide a vibratory conveyor element with a weighing device in such a way that this problem does not arise.

According to the present invention, there is provided a vibratory conveyor which comprises: a machine frame; a two-armed lever mounted on the frame for pivotal movement about an axis; a reaction base mounted on one arm of the lever; a conveyor element adapted to convey a product in a direction from a first end thereof toward a second end; at least one leaf spring connected between the conveyor element and the reaction base and arranged to vibrate so as to cause the conveyor element to convey product as aforesaid; and a sensor disposed between the said one arm and the machine frame for sensing the weight of product on the conveyor element; wherein a line connecting the said axis of pivotal movement and the centre of mass of the conveyor element runs perpendicular to the length of the or each leaf spring.

An embodiment of the invention is shown in the accompanying drawings, in which:

FIG. 1 is a side view of a vibratory conveyor incorporating the present invention; and FIG. 2 is a sketch plan view showing the relative disposition of two components thereof (a reaction base and a two armed lever).

The embodiment shown in the drawing comprises a vibratory conveyor element 1 which is adapted to convey product rightwardly as shown in the drawing and which is provided with a weighing device, described in more detail below. Product, for example a snack food such as crisps, is fed to the upstream end of the conveyor element 1 by a vibratory conveyor element 2 whose downstream end overlaps the upstream end of the conveyor element 1. It is to be understood that the conveyor element 2 might itself be fed by a further conveyor element (not shown) upstream thereof or, indeed, by a plurality of successive conveyor elements. It is also to be understood that the conveyor element 2 and/or any conveyor element or elements which feed it, need not be vibratory conveyor elements but could be of some other form, for example belt conveyors.

The vibratory conveyor has a base 3 which forms part of a machine frame and which carries two pairs of upstanding posts 4 and 5. The two posts 4, of which only one is visible in the drawing, are tied together by a bar 6 which, as seen in the drawing, extends perpendicular to the plane of the paper, and the two posts 5, of which only one is visible, are tied together by a similar extending bar 7. The bars 6 and 7 are in turn tied to one another by a bar 8. The posts 4 carry a structure 9 at their upper ends, to which are attached the lower ends of leaf springs 10. The upper ends of the leaf springs are secured to the underside of the conveyor element 2. Conventional means (not shown) are provided for causing the leaf springs 10 to vibrate in a direction perpendicular to their length, so as to cause product in the conveyor element 2 to travel rightwardly.

The conveyor element 1 is also provided with leaf springs, shown here as 11, to cause it to convey product rightwardly. The upper ends of the leaf springs are connected to the underside of the conveyor element 1, and the lower ends of the leaf springs are connected to a reaction base 12 which is at least approximately twice the mass of the conveyor element 1. The centre of mass of the reaction base 12 is at the location indicated in FIG. 1 by the cross thereon. As shown in FIG. 2, the reaction base comprises a rearward main mass 12a from which two arms 12b extend forwardly. A respective plate 12c is connected to each arm 12b and extends laterally outwardly therefrom, and a respective plate 12d extends on either side of main mass 12a.

The reaction base 12 is connected to one arm 13 of what is, in effect, a two-armed lever, the other arm being shown as arm 14. The lever is mounted on a post 15, the lower end of which is connected to the frame 3, for pivotal movement about an axis 16. As shown in FIG. 2, the arm 14 comprises two individual longitudinally extending arm members 14a. The ends of a counterrmass 17 are mounted on the arm members 14a. The countermass 17 can be slid along the arm members, and clamped at a desired location on the arm members by clamps 17a. In use, the countermass 17 is so positioned that it precisely balances the force applied to the arm 13 by the conveyor element 2 and the other structures connected to the arm 13. (Note that, contrary to what might appear from FIG. 1, there is no connection between the clamps 17a and the bar 8, which is spaced from the clamps in the plane of the drawing).

The arm 13 comprises two longitudinally extending arm members 13a. As seen in the plan view of FIG. 2 these are each laterally outwardly of a respective one of the arms 12b of the reaction mass 12. As considered in side view, the arm members 13a extend below the plates 12c, and below the plates 12d. Each of the plates 12c, 12d carries on its underside a downwardly facing cup 30. Each of the arms 13a carries two upwardly facing cups 31, each cup 31 being telescopically received with a respective one of the cups 30. A respective compression spring (not visible in the drawings) is received between each pair of telescopic cups. The springs serve to isolate the arms 13a from vibration in the reaction base 12 caused by operation of the vibratory conveyor. This is important in order to minimise vibration transmitted to the load cell (see below). Preferably the distances from the centres of each of these springs to the lines 23, marked as A and B in FIG. 1, are substantially equal to one another. If, less advantageously, the arrangement of cups 30 and 31, and associated springs, were to be omitted, the lever arm 13 and reaction base 12 could be combined in a single component, and references to the lever arm and reaction base are to be understood accordingly.

The underside of the distal end of the arm 13 has a structure which carries an inverted cup 18, the lower end of which is telescopically received within an upwardly facing cup 19. A spring (not shown) is located within the two cups and between their bases, so that when a downward force is applied to the cup 18 this is transmitted to the cup 19 via the spring. The lower end of the cup 19 is connected to a bar 20 which forms part of a load cell 21. The load cell can be of conventional construction, and the arrangement is such that when the cup 19 moves downwardly the bar 20 flexes, and flexing movement is registered by the load cell and appears as an output thereof, indicative of the downward force applied by the cup 18. A stop 22 is positioned between the base 3 and the arm 13 to prevent excessive downward movement of the arm 13 which might damage the load cell 21.

The centre of mass of the conveyor element 1 is denoted by a cross thereon, and it will be seen that a straight line, indicated as 23, passes through the centre of mass of the conveyor element 1, the centre of mass of the reaction base 12 and the pivoting axis 16. It will also be seen that the line 23 runs perpendicular to the lengths of the leaf springs 11. Because of this arrangement, the forces generated by the vibrating movement of the tray and the base run through the two centre of masses indicated and through the pivot 16, and there is no component of force which can pass through the load cell 21 and thus affect its output. Accordingly, what the load cell measures is purely the weight of product on the conveyor element 1. The output of the load cell can therefore be used to provide an accurate indication to, for example, a system for adding a flavouring to product on the conveyor element 1 in dependence on the mass flow rate of the product along that element.

The invention claimed is:

1. A vibratory conveyor which comprises:
   a machine frame;
   a two-armed lever mounted on the frame for pivotal movement about an axis;
   a reaction base mounted on one arm of the lever;
   a conveyor element adapted to convey a product in a direction from a first end thereof toward a second end;
   at least one leaf spring connected between the conveyor element and the reaction base and arranged to vibrate so as to cause the conveyor element to convey product as aforesaid; and
   a sensor disposed between the said one arm and the machine frame for sensing the weight of product on the conveyor element;
   wherein a line connecting the said axis of pivotal movement and the centre of mass of the conveyor element runs perpendicular to the length of the or each leaf spring.

2. A conveyor according to claim 1, wherein a vibration isolation means is provided between the reaction base and the said one arm of the lever.

3. A conveyor according to claim 2, wherein the said isolation means comprises at least one spring.

4. A conveyor according to claim 1, wherein the reaction base and the said one arm of the lever are provided by a single component.

5. A conveyor according to claim 1, wherein a countermass is mounted on other arm of the two-armed lever to counterbalance the force applied to the first arm when there is no product on the conveyor element.

6. A conveyor according to claim 5, wherein the position of the countermass is adjustable along the length of said other arm.

7. A conveyor according to claim 1, wherein the weight sensor comprises a load cell.

8. A conveyor according to claim 1, in combination with means for adding an agent to product on the conveyor element, in dependence on the weight sensed by the weight sensor.

9. A conveyor according to claim 1, further comprising at least one additional conveyor element upstream of the first mentioned conveyor element, for transporting product to the latter.

10. A conveyor according to claim 1, wherein the sensor receives load from the said one arm via a spring.

* * * * *